Aug. 24, 1943.  C. S. SCHROEDER  2,327,848
INDUSTRIAL TRUCK
Original Filed Aug. 3, 1940   3 Sheets-Sheet 2
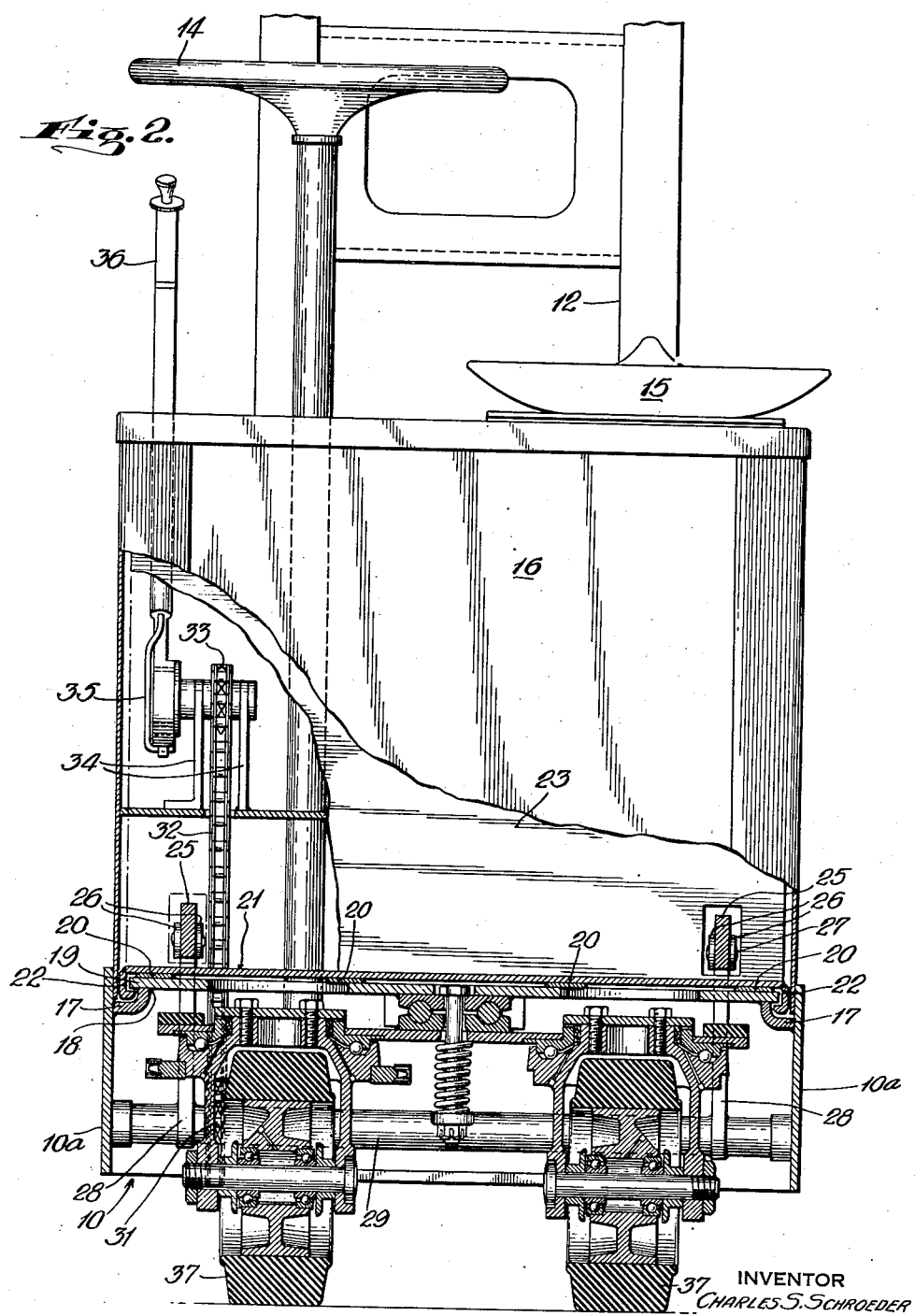
INVENTOR
CHARLES S. SCHROEDER
BY
ATTORNEY Aug. 24, 1943.   C. S. SCHROEDER   2,327,848
INDUSTRIAL TRUCK
Original Filed Aug. 3, 1940    3 Sheets-Sheet 3
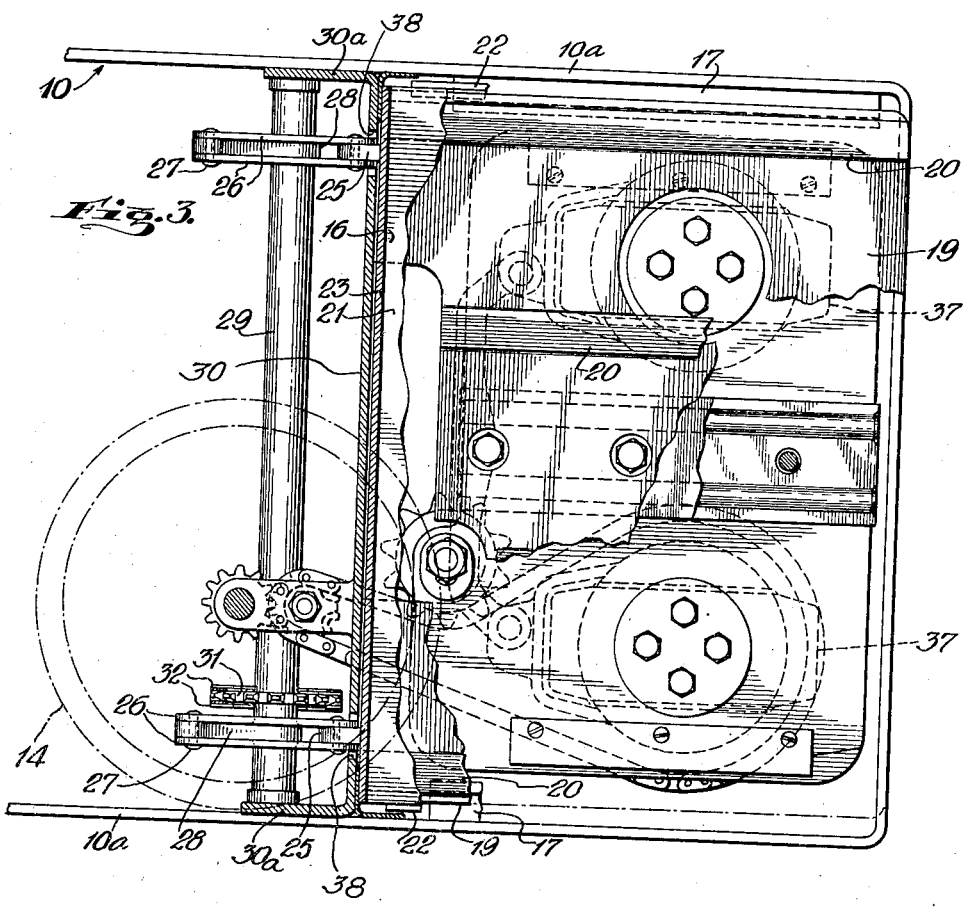
INVENTOR
CHARLES S. SCHROEDER
BY Patented Aug. 24, 1943

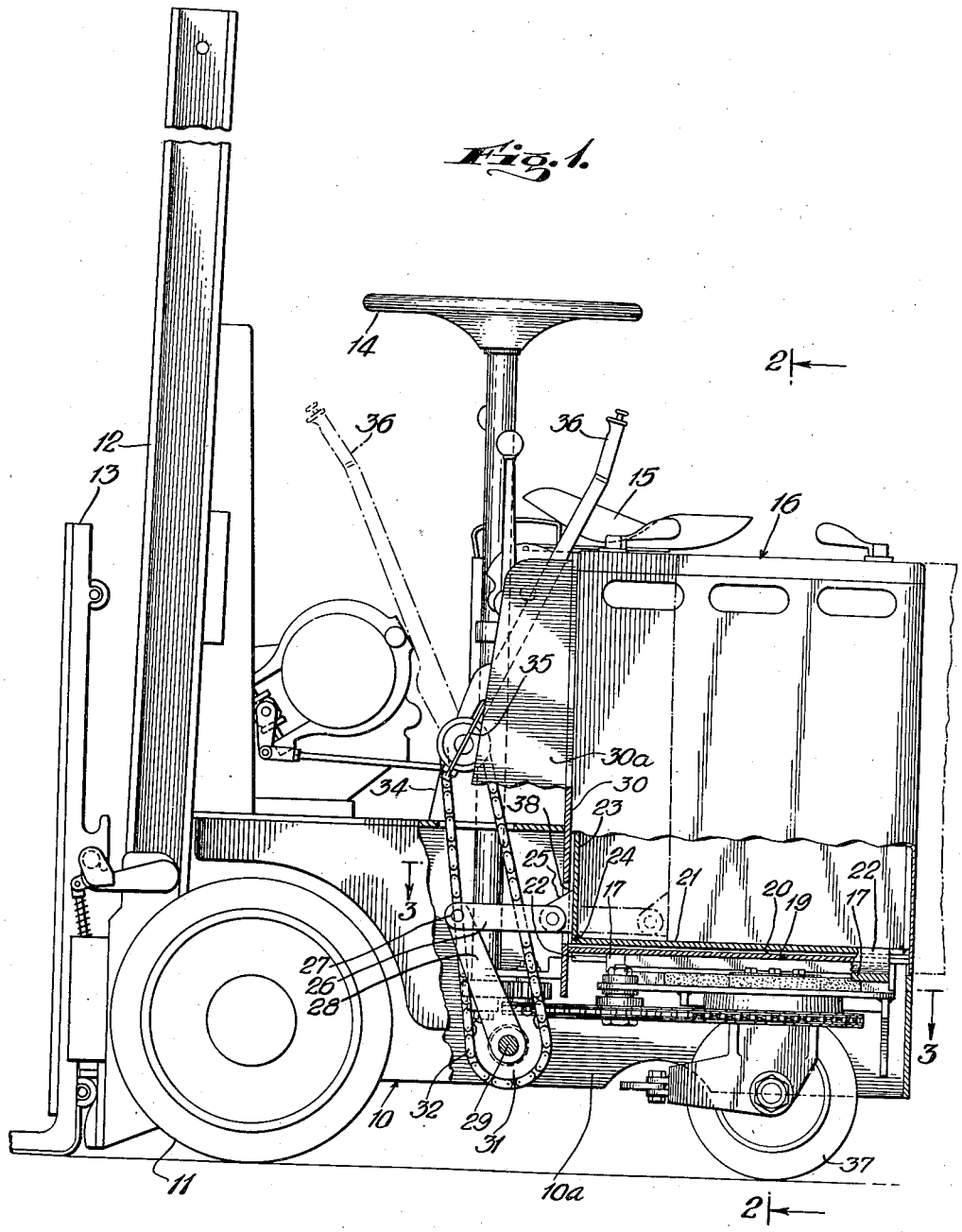

2,327,848

UNITED STATES PATENT OFFICE 2,327,848

INDUSTRIAL TRUCK

Charles S. Schroeder, Philadelphia, Pa., assignor to The Yale & Towne Manufacturing Company, Stamford, Conn., a corporation of Connecticut Original application August 3, 1940, Serial No. 350,728. Divided and this application January 28, 1942, Serial No. 428,473

10 Claims. (Cl. 214—113)

This invention relates to an industrial truck, and more particularly, to means whereby an industrial truck is stabilized for handling heavy loads.

This application is a division of my application Serial No. 350,728 filed August 3, 1940, in which I describe and claim a novel form of wheel supporting mechanism whereby the wheels may move to compensate for irregularities in the floor or ground, while the effective width or tread of the truck is increased beyond the actual width or tread, so as to contribute considerably greater stability to the truck.

As a feature of the invention to be described and claimed in this application, I utilize a movable power element, which in this particular case is a battery mounted in a compartment. In industrial trucks of the type for which my invention is particularly adapted, the load is frequently carried on forks or other means overhanging one end of the truck, and it therefore becomes necessary to counterbalance the overhanging load. This I do in my invention by moving the power carrying unit, or battery in this case, relatively to the truck so as, in effect, to lengthen the truck and to utilize the relatively heavy battery as a counterbalance for the load. The means whereby I move the battery carrying compartment are preferably mounted on the main frame, and are extremely novel and form an important part of my invention.

I have thus described generally the more important features of my invention in order that the scope and nature of my contribution to the art may be better understood. There are, of course, other features of my invention which I shall hereinafter describe and claim. While I shall now show and describe a particular preferred form of my invention, it should be understood that I deem myself entitled to patent claims which will prevent the utilization of my contribution in physical forms other than those by me described herein.

Referring now to the drawings wherein is shown a preferred form of my invention, Fig. 1 is an elevation and partial section of an industrial truck in which my invention is embodied. Fig. 2 is a section taken substantially along lines 2—2 of Fig. 1. Fig. 3 is a section taken along lines 3—3 of Fig. 1.

Referring now more particularly to the drawings, and especially to Fig. 1, reference numeral 10 indicates the main frame of a truck having forward load supporting wheels 11, rear load supporting and steering wheels 37, and a pair of vertical standards 12, on which are carried load forks 13 for elevating a load, all in a manner well understood by those skilled in the art.

At the center of the truck there is maintained in position a steering wheel 14 adapted to be rotated by an operator who occupies the seat 15, which seat is suitably mounted so as to swing clear of a movable battery compartment 16 that contains the storage battery for powering the truck. In some trucks, this battery compartment may be a gas-electric or other type of unit, all as will be appreciated by those skilled in the art.

As will be best seen from Fig. 2, side bars 10a of the main frame 10 of the truck have welded thereto angle members 17, which in turn are welded as at 18 to what I term a main frame plate 19. This main frame plate 19 carries a series of longitudinal bearing bars 20, shown in cross section in Fig. 2, and it is on these bearing bars 20 that the bottom plate 21 of the battery compartment 16 slides. This bottom plate 21 has further extending therefrom complementary downwardly depending flanges 22 which cooperate with the ends of the main frame plate 19 for guiding the bottom plate 21 of the battery compartment relatively to the main frame, all as will be well understood from the drawings.

Referring back once again to Fig. 1, it will be noted that the battery compartment has a front plate 23 which is welded to the bottom plate 21 as at 24, and to suitable side plates of the battery compartment which need not here be designated. Welded in turn to this front plate 23, at each side thereof, are ears 25 which can be seen in Fig. 3. These ears project through openings 38 in a vertical plate 30, which is suitably welded to the main frame of the truck to become an integral portion thereof. Pivoted to each of the ears 25 is a bifurcated link member 26 which is pivoted at 27 to a crank 28. Each of the cranks 28 is formed integrally with a shaft 29 mounted for rotation relatively to plates 30a extending longitudinally from the vertical plate 30, and thus forming an integral part of the main frame.

Integrally with the shaft 29, there is secured a sprocket 31 that is in driven engagement with a chain 32, the chain 32 being in turn driven by a sprocket 33, shown in Fig. 2 to be mounted for rotation relatively to a pair of standards 34 welded to and forming part of the main frame.

For rotating the sprocket 33, there is utilized a pawl and ratchet mechanism, preferably of any readily reversible type, the detailed construction of which is not important to consider in this case. Suffice it to say, this mechanism is preferably actuated by a hand lever 36 so as to rotate the sprocket 33 in one direction or the other, and through the chain 32, to rotate the shaft 29 in one direction or the other. Depending, of course, upon the rotation of the shaft 29, the cranks 28 through the link members 26 and ears 25, move the battery compartment 16 from its full line position of Fig. 1 to its dash and dot position of Fig. 1 and back again.

It will now be appreciated that when there is a heavy load on the forks 13, and it is desirable to have the battery compartment 16 in its dash and dot position of Fig. 1, it may be easily and quickly moved to that position by operation of the hand lever 36 through the means just described. The load on the forks will now be effectively counterbalanced, as will be fully appreciated.

The manner in which the steering wheels 37 of my truck are mounted and operated is fully illustrated in the drawings, and will be quite apparent to those skilled in the art. Since this portion of my truck is well described in the parent application, of which this application is a division, no further description will be herein presented.

I claim:

1. In a truck of the class described, a main frame, front and rear supporting wheels for said main frame, a battery compartment, bearing means on said main frame supporting said battery compartment for longitudinal sliding movement relatively to said main frame, and means for moving said compartment on said bearing means.

2. In a truck of the class described, a main frame, front and rear supporting wheels for said main frame, a battery compartment at one end of said main frame, load lifting means at the other end of said main frame, bearing means on said main frame supporting said battery compartment for longitudinal sliding movement relatively to said main frame, and manually operated step by step actuating means connected to said battery compartment for moving said compartment on said bearing means.

3. In a truck of the class described, a main frame, front and rear supporting wheels for said main frame, a battery compartment at one end of said frame, load lifting means at the other end of said main frame, bearing means on said main frame supporting said battery compartment for sliding movement longitudinally relatively to said main frame, and manually operated crank means on said main frame connected to said battery compartment for moving said compartment on said bearing means.

4. In a truck of the class described, a main frame, front and rear supporting wheels for said main frame, a battery compartment, bearing means on said main frame supporting said battery compartment for longitudinal sliding movement relatively to said main frame, a pair of ears secured to said compartment, a crank connected to said ears, and manual means mounted on said main frame for actuating said crank whereby to move said compartment back and forth on said bearing means.

5. In a truck of the class described, a main frame, front and rear supporting wheels for said main frame, a battery compartment at one end of said main frame, load lifting means at the other end of said main frame, bearing means on said main frame supporting said battery compartment for longitudinal sliding movement relatively to said main frame, a crank and lever connected to said battery compartment, a ratchet for rotating said crank, and a manually operable lever for actuating said ratchet and therefore said crank, whereby to move said compartment on said bearing means.

6. In a truck of the class described, a main frame, front and rear supporting wheels for said main frame, a battery compartment at one end of said main frame, load lifting means at the other end of said main frame, operating controls midway of said main frame and an operator's seat on said battery compartment whereby an operator in said seat has access to said controls, bearing means on said main frame supporting said battery compartment for sliding movement longitudinally relatively to said main frame, and manually operated means accessible to the operator for moving said compartment on said bearing means.

7. In a truck of the class described, a main frame, front and rear supporting wheels for said main frame, a power unit compartment, bearing means on said main frame supporting said power unit compartment for longitudinal sliding movement relatively to said main frame, and means for securing said compartment in any one of several longitudinal positions on said bearing means.

8. In a truck of the class described, a main frame, front and rear supporting wheels for said main frame, a power unit compartment, bearing means on said main frame supporting said power unit compartment for longitudinal sliding movement relatively to said main frame, and means for moving said compartment on said bearing means.

9. In a truck of the class described, a main frame, front and rear supporting wheels for said main frame, a power unit compartment, bearing means on said main frame supporting said power unit compartment for longitudinal sliding movement relatively to said main frame, and means for securing said compartment in any one of several longitudinal positions on said bearing means.

10. In a truck of the class described, a main frame, front and rear supporting wheels for said main frame, a power unit compartment at one end of said main frame, load lifting means at the other end of said main frame, bearing means on said main frame supporting said power unit compartment for longitudinal sliding movement relatively to said main frame, and manually operated step by step actuating means connected to said power unit compartment for moving said compartment on said bearing means.

CHARLES S. SCHROEDER.